(12) United States Patent
Kiyoshima et al.

(10) Patent No.: US 8,724,569 B2
(45) Date of Patent: May 13, 2014

(54) RADIO BASE STATION AND MOBILE COMMUNICATION METHOD

(75) Inventors: Kohei Kiyoshima, Kawasaki (JP); Hiroyuki Ishii, Yokohama (JP); Naoto Okubo, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 114 days.

(21) Appl. No.: 13/259,030

(22) PCT Filed: Mar. 24, 2010

(86) PCT No.: PCT/JP2010/055020
§ 371 (c)(1),
(2), (4) Date: Nov. 16, 2011

(87) PCT Pub. No.: WO2010/110285
PCT Pub. Date: Sep. 30, 2010

(65) Prior Publication Data
US 2012/0063399 A1 Mar. 15, 2012

(30) Foreign Application Priority Data
Mar. 25, 2009 (JP) ................. P2009-075221

(51) Int. Cl.
*H04W 4/00* (2009.01)
*H04L 12/26* (2006.01)
*H04J 3/00* (2006.01)
*H04J 4/00* (2006.01)

(52) U.S. Cl.
USPC ........... 370/329; 370/252; 370/330; 370/341; 370/345; 370/436

(58) Field of Classification Search
USPC ............ 370/230.1, 252, 280, 281, 314, 370/319–321, 328–330, 335–337, 341–345, 370/347, 348, 431, 436, 437; 455/450, 464
See application file for complete search history.

(56) References Cited

U.S. PATENT DOCUMENTS

2009/0054006 A1* 2/2009 Cai et al. ................... 455/73
2009/0109907 A1* 4/2009 Tsai et al. .................. 370/329

(Continued)

FOREIGN PATENT DOCUMENTS

| EP | 2 180 733 A1 | 4/2010 |
|---|---|---|
| WO | 2008/120544 A1 | 10/2008 |
| WO | 2009/022704 A1 | 2/2009 |

OTHER PUBLICATIONS

International Search Report w/translation from PCT/JP2010/055020 dated Jun. 29, 2010 (2 pages).

(Continued)

*Primary Examiner* — Christopher Grey
*Assistant Examiner* — Peian Lou
(74) *Attorney, Agent, or Firm* — Osha Liang LLP

(57) ABSTRACT

A radio base station includes a resource assignment unit for assigning a resource candidate for transmitting a semi-persistent scheduling transmission acknowledgement signal to a first mobile station during a semi-persistent scheduling bearer setting process. The resource candidate for transmitting a semi-persistent scheduling transmission acknowledgement signal is formed by a combination of a frequency direction resource and a code direction resource by which the first mobile station transmits a transmission acknowledgement signal after a predetermined timing from a timing of receiving downlink data, to the downlink data that has been scheduled by semi-persistent scheduling and has been transmitted via a downlink data channel. The resource assignment unit is configured to assign the resource candidate for transmitting a semi-persistent scheduling transmission acknowledgement signal to the first mobile station based on a number of assignments of predetermined resources formed by a combination of a frequency direction resource and a code direction resource.

9 Claims, 17 Drawing Sheets

(56) References Cited

U.S. PATENT DOCUMENTS

2009/0245194 A1* 10/2009 Damnjanovic et al. ....... 370/329
2010/0118803 A1  5/2010 Ishii et al.
2011/0182245 A1* 7/2011 Malkamaki et al. .......... 370/329

OTHER PUBLICATIONS

3GPP TS 36.213 V8.5.0; "3rd Generation Partnership Project; Technical Specification Group Radio Access Network; Evolved Universal Terrestrial Radio Access (E-UTRA); Physical layer procedures (Release 8)"; Dec. 2008 (74 pages).

3GPP TS 36.211 V8.5.0; "3rd Generation Partnership Project; Technical Specification Group Radio Access Network; Evolved Universal Terrestrial Radio Access (E-UTRA); Physical Channels and Modulation (Release 8)"; Dec. 2008 (82 pages).

* cited by examiner

RADIO BASE STATION AND MOBILE COMMUNICATION METHOD

TECHNICAL FIELD

The present invention relates to a radio base station and a mobile communication method.

BACKGROUND OF THE INVENTION

In a mobile communication system of an LIE (Long Term Evolution) scheme defined in the 3GPP, each mobile station UE is configured to transmit a transmission acknowledgement signal (SPS A/N) after a predetermined timing (e.g., four sub-frames) from the timing of receiving downlink data to a radio base station eNB via PUCCH (Physical Uplink Control Channel) with respect to the downlink data scheduled by semi-persistent scheduling (hereinafter, referred to as "SPS") and transmitted via PDSCH (Physical Downlink Shared Channel, a downlink data channel).

However, since a method for assigning an SPS A/N transmission resource candidate to each mobile station UE has not been defined in the 3GPP, there is a problem that the SPS A/N transmission resource candidate may not be appropriately assigned in the above-mentioned mobile communication system.

Therefore, the present invention is intended to overcome the above-described problem. An object of the present invention is to provide a radio base station capable of appropriately assigning an SPS A/N transmission resource candidate, and a mobile communication method therefor.

SUMMARY OF THE INVENTION

The first feature of the present invention is summarized in that a radio base station comprising a resource assignment unit configured to assign a resource candidate for transmitting a semi-persistent scheduling transmission acknowledgement signal to a first mobile station during a semi-persistent scheduling bearer setting process, the resource candidate for transmitting a semi-persistent scheduling transmission acknowledgement signal is a resource candidate formed by a combination of a frequency direction resource and a code direction resource by which the first mobile station transmits a transmission acknowledgement signal after a predetermined timing from a timing of receiving downlink data, to the downlink data that has been scheduled by semi-persistent scheduling and has been transmitted via a downlink data channel, and the resource assignment unit is configured to assign the resource candidate for transmitting a semi-persistent scheduling transmission acknowledgement signal to the first mobile station based on a number of assignments of predetermined resources formed by a combination of a frequency direction resource and a code direction resource during a semi-persistent scheduling transmission acknowledgement signal transmission period of the first mobile station, and when the downlink data is scheduled by the semi-persistent scheduling, the resource assignment unit is configured to select a resource for transmitting a transmission acknowledgment signal for the downlink data from among the resource candidates for transmitting a semi-persistent scheduling transmission acknowledgement signal.

The second feature of the present invention is summarized in that a mobile communication method comprising a step A of assigning a resource candidate for transmitting a semi-persistent scheduling transmission acknowledgement signal to a first mobile station during a semi-persistent scheduling bearer setting process, the resource candidate for transmitting a semi-persistent scheduling transmission acknowledgement signals is a resource candidate formed by a combination of a frequency direction resource and a code direction resource by which the first mobile station transmits a transmission acknowledgement signal after a predetermined timing from a timing of receiving downlink data, to the downlink data that has been scheduled by semi-persistent scheduling and has been transmitted via a downlink data channel, in the step A, the resource candidate for transmitting a semi-persistent scheduling transmission acknowledgement signal is assigned to the first mobile station based on a number of assignments of predetermined resources formed by a combination of a frequency direction resource and a code direction resource during a semi-persistent scheduling transmission acknowledgement single transmission period of the first mobile station, and the mobile communication method further includes a step B of, when the downlink data is scheduled by the semi-persistent scheduling, selecting a resource for transmitting a transmission acknowledgement signal for the downlink data from among the resource candidates for transmitting a semi-persistent scheduling transmission acknowledgement signal.

As described above, according to the present invention, it is possible to provide a radio base station capable appropriately assigning an SPS A/N transmission resource, and a mobile communication method therefor.

DETAILED DESCRIPTION (Configuration of mobile communication system according to first embodiment of the present invention)

With reference to FIG. 1 to FIG. 16, the configuration of a mobile communication system according to a first embodiment of the present invention will be explained.

Figure 1:
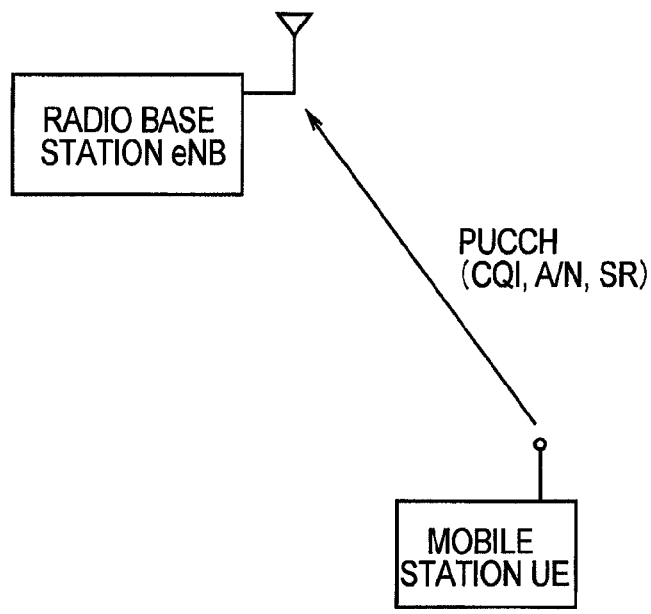
FIG. 1 is a diagram showing the entire configuration of a mobile communication system according to a first embodiment of the present invention.

The mobile communication system according to this embodiment is a mobile communication system of an LIE scheme. In the mobile communication system according to this embodiment, as illustrated in FIG. 1, a mobile station UE is configured to transmit CQI (Channel Quality Indicator) indicating a reception quality to be used for notifying a reception quality in a downlink, ACK/NACK (hereinafter, referred to as "A/N") for downlink data, a scheduling request (hereinafter, referred to as "SR") that requests scheduling for uplink data communication, and the like to a radio base station eNB via PUCCH.

Figure 2:
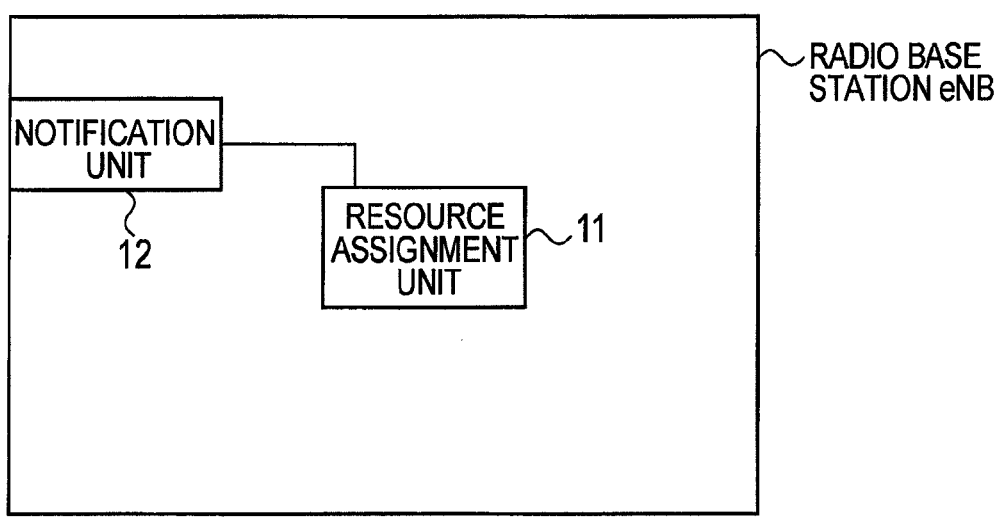
FIG. 2 is a functional block diagram of a radio base station according to the first embodiment of the present invention.

As illustrated in FIG. 2, the radio base station eNB includes a resource assignment unit 11 and a notification unit 12.

The resource assignment unit 11 is configured to assign a predetermined physical channel resource in each cell subordinate to the radio base station eNB.

For example, the resource assignment unit 11 is configured to assign a PUCCH resource, a PUSCH (Physical Uplink Shared Channel) resource and the like as an uplink physical channel resource in each cell subordinate to the radio base station eNB.

Further, the resource assignment unit 11 is configured to assign a PDCCH (Physical Downlink Control Channel) resource, a PDSCH (Physical Downlink Shared Channel) resource and the like as a downlink physical channel resource in each cell subordinate to the radio base station eNB.

Here, the resource assignment unit 11 is configured to assign a CQI transmission resource, an A/N transmission resource, or an SR transmission resource, from among the PUCCH resources.

A specific example of the operation in which the resource assignment unit 11 assigns the resource will be explained later.

The notification unit 12 is configured to notify the resource assigned by the resource assignment unit 11 in each cell subordinate to the radio base station eNB.

Specifically, the notification unit 12 is configured to notify each mobile station UE of the CQI transmission resource, the A/N transmission resource, or the SR transmission resource by way of an RRC message.

The specific example of the operation in which the resource assignment unit 11 assigns the resource will be explained, below.

In the mobile communication system according to this embodiment, it is explained that the mobile station UE is configured to operate in a discontinuous reception mode and to receive downlink data scheduled by SPS, as an example.

Figure 3:
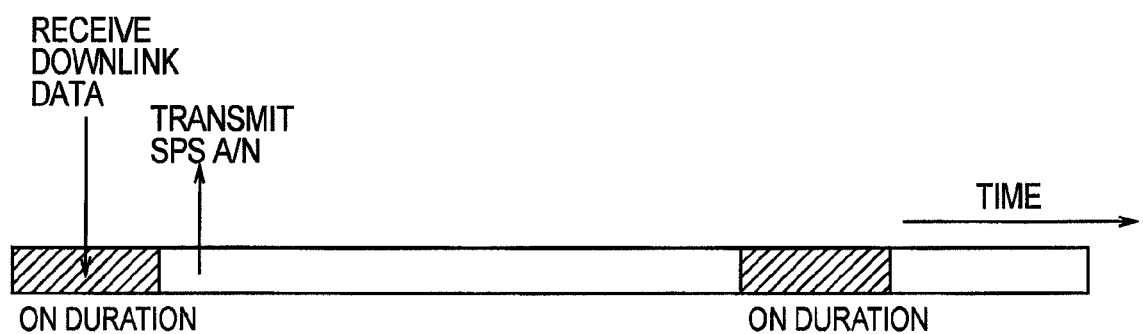
FIG. 3 is a diagram explaining a timing of transmitting SPS A/N in a mobile communication system according to the first embodiment of the present invention.

As illustrated in FIG. 3, "On Duration (discontinuous reception period)" is set in the mobile station UE, and the mobile station UE is configured to receive the downlink data scheduled by the SPS and transmitted via PDSCH only in the "On Duration".

Then, the mobile station UE is configured to transmit SPS A/N for the downlink data after a predetermined timing (e.g., four sub-frames) from the timing of receiving the downlink data.

Here, in the mobile station UE, since the reception timing in the "On Duration" of the downlink data is arbitrary, it is probable that a collision may occur in SPS A/N transmission timing in a plurality of mobile stations UE.

In order to avoid such a problem, the resource assignment unit 11 is configured to assign a predetermined number of (e.g., four) SPS A/N transmission resource candidates to the mobile station UE during an SPS bearer setting process, and then select a resource for transmitting SPS A/N for downlink data from among the SPS A/N transmission resource candidates when the downlink data is scheduled by the SPS.

Here, the SPS A/N transmission resource candidate is a resource candidate formed by a combination of a frequency direction resource and a code direction resource by which the mobile station UE transmits the SPS A/N to downlink data that has been scheduled by the SPS and has been transmitted via the PDSCH, after a predetermined timing (e.g., four sub-frames) from the timing of receiving the downlink data.

Hereinafter, a resource assignable as the SPS A/N transmission resource candidate will be described.

Figure 4:
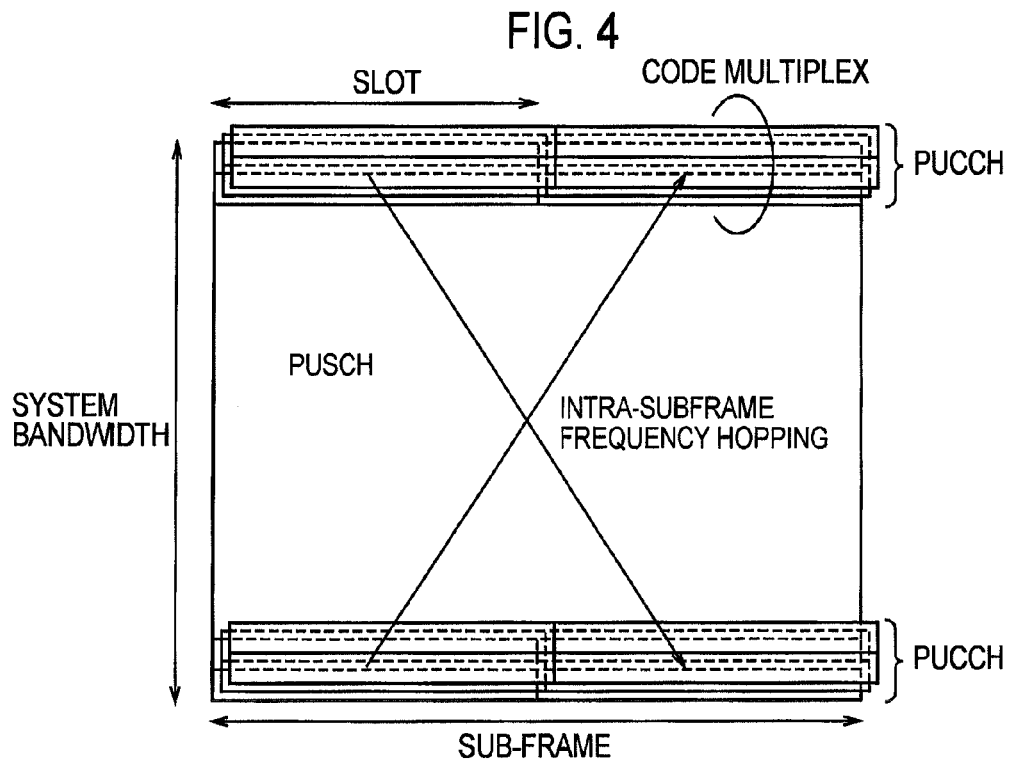
FIG. 4 is a diagram explaining a method in which the radio base station according to the first embodiment of the present invention assigns a PUCCH resource.
Figure 5:
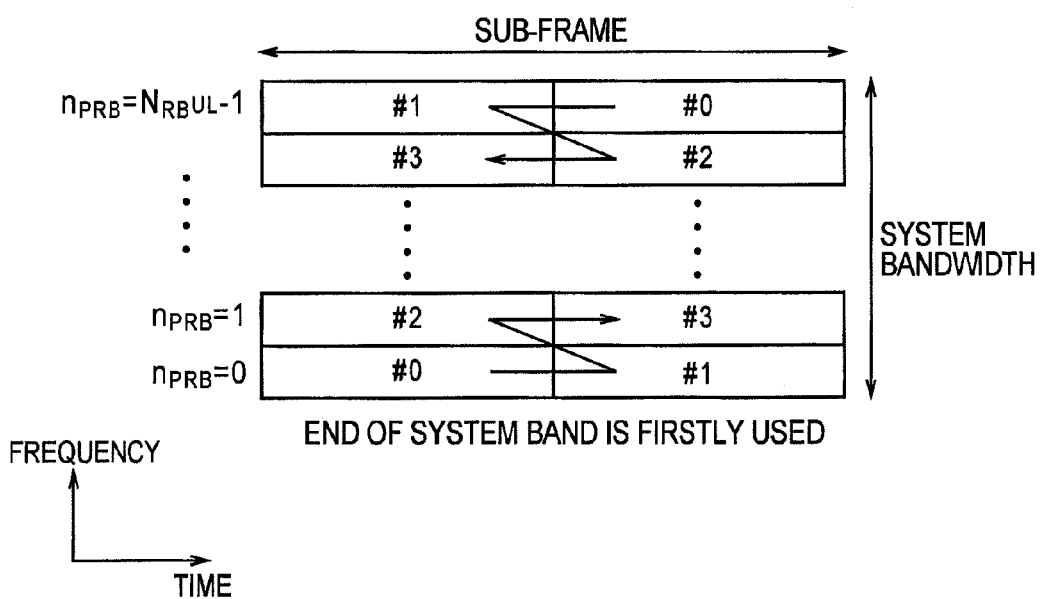
FIG. 5 is a diagram explaining a resource block within a PUCCH resource assigned by the radio base station according to the first embodiment of the present invention.

As illustrated in FIG. 4 and FIG. 5, in order from resource blocks at both ends of a system bandwidth, the resource assignment unit 11 is configured to assign a resource block as a PUCCH resource block, and to assign a resource block inside a resource block assigned as a PUCCH resource block, as a PUSCH resource block.<

Here, each resource block (hereinafter, referred to as "RB") is configured by 7 OFDM symbols and 12 sub-carriers.

It is noted that as illustrated in FIG. 4, it is configured that in each PUCCH RB, code multiplexing is performed. Thus, the resource assignment unit 11 is configured to assign the time direction resource, the frequency direction resource, and the code direction resource as the PUCCH resource.

Further, the resource assignment unit 11 is configured to assign the PUCCH resource between a first half portion (slot) within a single sub-frame and a second half (slot) thereof, by way of "Intra-subframe frequency hopping" as illustrated in FIG. 4.

As illustrated in FIG. 5, the resource assignment unit 11 is configured to assign two RBs to which the same RB number is imparted as the same PUCCH RBs.

Figure 6:
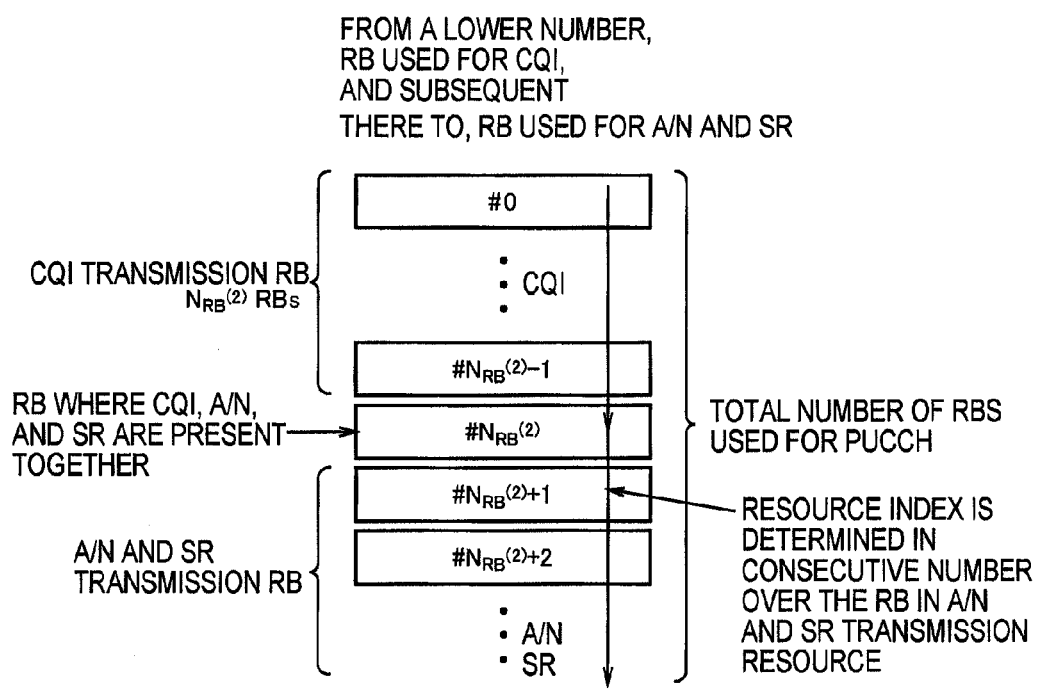
FIG. 6 is a diagram explaining a method in which a resource block within a PUCCH resource is assigned by the radio base station according to the first embodiment of the present invention assigns in order to transmit CQI, A/N, and SR.

As illustrated in FIG. 6, among the RBs assigned as the PUCCH RB, the resource assignment unit 11 is configured to sequentially assign RB to which a lower RB number is imparted as the CQI transmission RB, and then to assign remaining RBs as the A/N transmission RB and the SR transmission RB.

It is noted that, as illustrated in FIG. 6, the PUCCH RB may include "RBs where the CQI, the A/N, and the SR are present together", which are the CQI transmission RBs, the A/N transmission RBs, and the SR transmission RBs.

The resource assignment unit 11 is configured to determine RB (frequency direction resource) assignable to each mobile station UE as the A/N transmission resource and the SR transmission resource, from among the RBs assigned as the PUCCH RBs.

Figure 7:
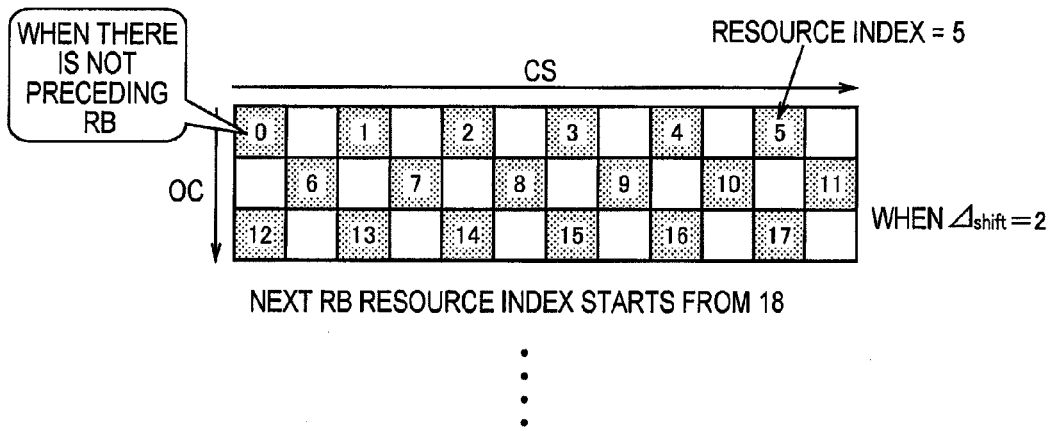
FIG. 7 is a diagram explaining a resource block assigned for transmitting A/N and SR, of resource blocks within a PUCCH resource, by the radio base station according to the first embodiment of the present invention.

Further, as illustrated in FIG. 7, a code direction resource assignable as the A/N transmission resource and the SR transmission resource is multiplexed by a combination (hereinafter, referred to as "CS/OC") of a plurality of (e.g., three) OCs (Orthogonal Codes) and a plurality of (e.g., 12) cyclic sequences (hereinafter, referred to as "CSs") which have a "cyclic shift" relation to each other while being orthogonal to each other in each RB.

As illustrated in FIG. 7, a resource index is imparted to the code direction resource (CS/OC) assignable as the A/N transmission resource and the SR transmission resource within a single sub-frame. The resource index is configured to be continuously imparted over a plurality of RBs within a single sub-frame.

Figure 8:
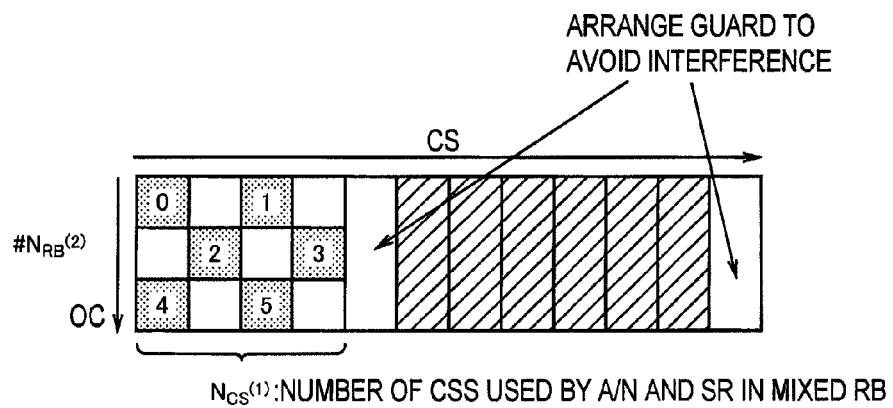
FIG. 8 is a diagram explaining a resource block assigned for transmitting CQI, A/N, and SR in a mixed manner, of resource blocks within a PUCCH resource, by the radio base station according to the first embodiment of the present invention.

Further, in RB #$N_{RB}^{(2)}$ where CQI, A/N and SR are present together, as illustrated in FIG. 8, there exist a code direction resource (CS/OC) assignable as a CQI transmission resource and a code direction resource (CS/OC) assignable as an A/N transmission resource and an SR transmission resource.

Here, "$N_{CS}^{(1)}$" denotes the number of the CSs assignable as the A/N transmission resource and the SR transmission resource in the RBs where the CQI, the A/N and the SR are present together, and is a multiple of $\Delta_{shift}$. The $\Delta_{shift}$ denotes the amount of "Cyclic Shift" used when calculating the CS.

In the example of FIG. 8, as the A/N transmission resource and the SR transmission resource, four code direction resources (CSs) can be multiplexed in one frequency direction resource (RB) and three orthogonal codes (OCs) can be multiplexed in one code direction resource (CS).

It is noted that, in order to avoid interference, a code direction resource (CS) for guard is provided between the code direction resource (CS) assignable as the CQI transmission resource and the code direction resource (CS) assignable as the A/N transmission resource and the SR transmission resource. Further, the code direction resource (CS) for guard may be provided between the code direction resources (CSs) assignable as the CQI transmission resource.

The resource index imparted to the code direction resource (CS) assignable as the CQI transmission resource and the resource index imparted to the code direction resource (CS/OC) assignable as the A/N transmission resource and the SR transmission resource are separated from each other.

Figure 9:
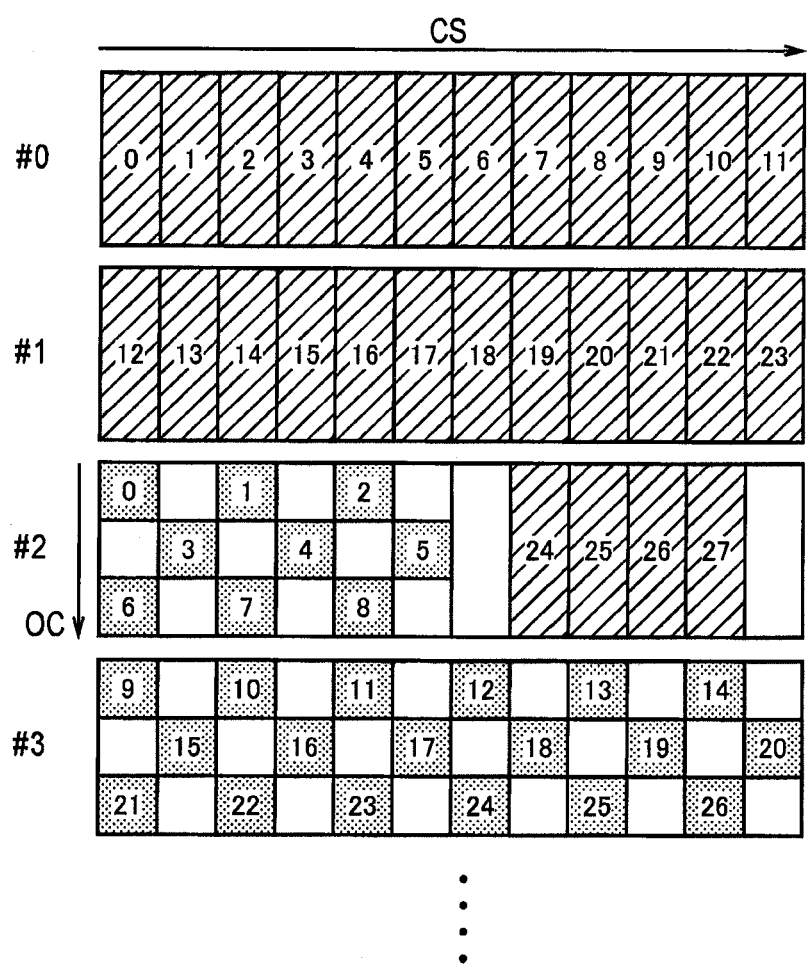
FIG. 9 is a diagram explaining one example of a frequency direction and code direction resources within a PUCCH resource assigned by the radio base station according to the first embodiment of the present invention.

FIG. 9 illustrates an example of the resource index imparted to the code direction resource (CS) assignable as the CQI transmission resource in the PUCCH transmission RB and the resource index imparted to the code direction resource (CS/OC) assignable as the A/N transmission resource and the SR transmission resource.

Figure 10:
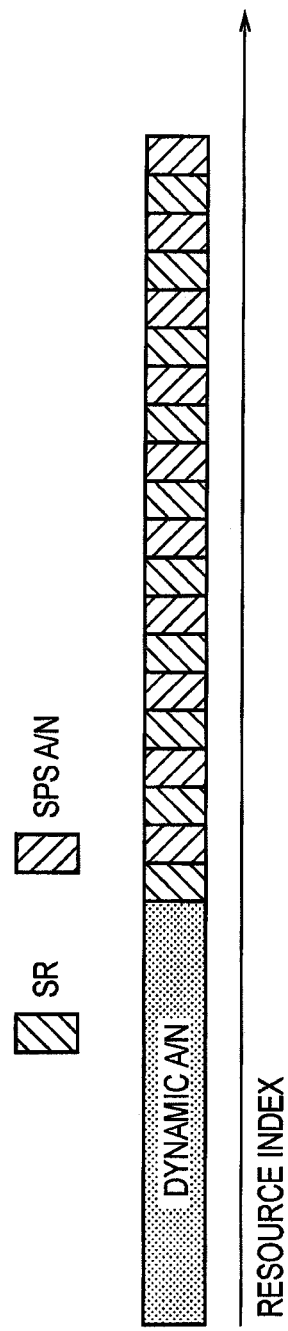
FIG. 10 is a diagram explaining a method in which an SPS A/N transmission resource is assigned by the radio base station according to the first embodiment of the present invention.

Further, as illustrated in FIG. 10, the code direction resource (CS/OC) assignable as the A/N transmission resource and the SR transmission resource is assignable (available) as a dynamic scheduling transmission acknowledgement signal transmission resource (Dynamic Scheduling A/N transmission resource, hereinafter, referred to as "DS A/N transmission resource"), an SPS A/N transmission resource, and an SR transmission resource.

Here, the SPS denotes scheduling configured to periodically assign a fixed resource (e.g., a PDSCH resources and a PUSCH resource) to the mobile station UE, and the dynamic scheduling (hereinafter, referred to as "DS") denotes scheduling configured to assign a resource (e.g., a PDSCH resource and a PUSCH resource) to the mobile station UE at each sub-frame.

Further, the DS A/N transmission resource is a resource used to transmit A/N for downlink data scheduled by the DS and transmitted via PDSCH.

Specifically, as illustrated in FIG. 10, the resource assignment unit 11 may be configured to use remaining CS/OCs other than CS/OC, which is available as the DS A/N transmission resource, among CS/OCs available as the A/N transmission resource and the SR transmission resource, as CS/OC available as the SPS A/N transmission resource or the SR transmission resource.

In this case, the number of CS/OCs necessary for the DS A/N transmission resource is fixedly determined by a system bandwidth. For example, when the system bandwidth is "5 MHz", the number of CS/OCs necessary for the DS A/N transmission resource is "20".

Further, as illustrated in FIG. 10, when the CS/OCs are arranged in the order of resource indexes, the resource assignment unit 11 may be configured to set CS/OC at a head front resource index as CS/OC available as the DS A/N transmission resource, and to alternately set the remaining CS/OCs as CS/OCs available as the SPS A/N transmission resource or the SR transmission resource.

It is noted that, since the transmission frequency of SR is low, the CS/OC available as the SR transmission resource is inserted among the CS/OCs available as the SPS A/N transmission resource, so that it is possible to reduce interference.

Figure 11:
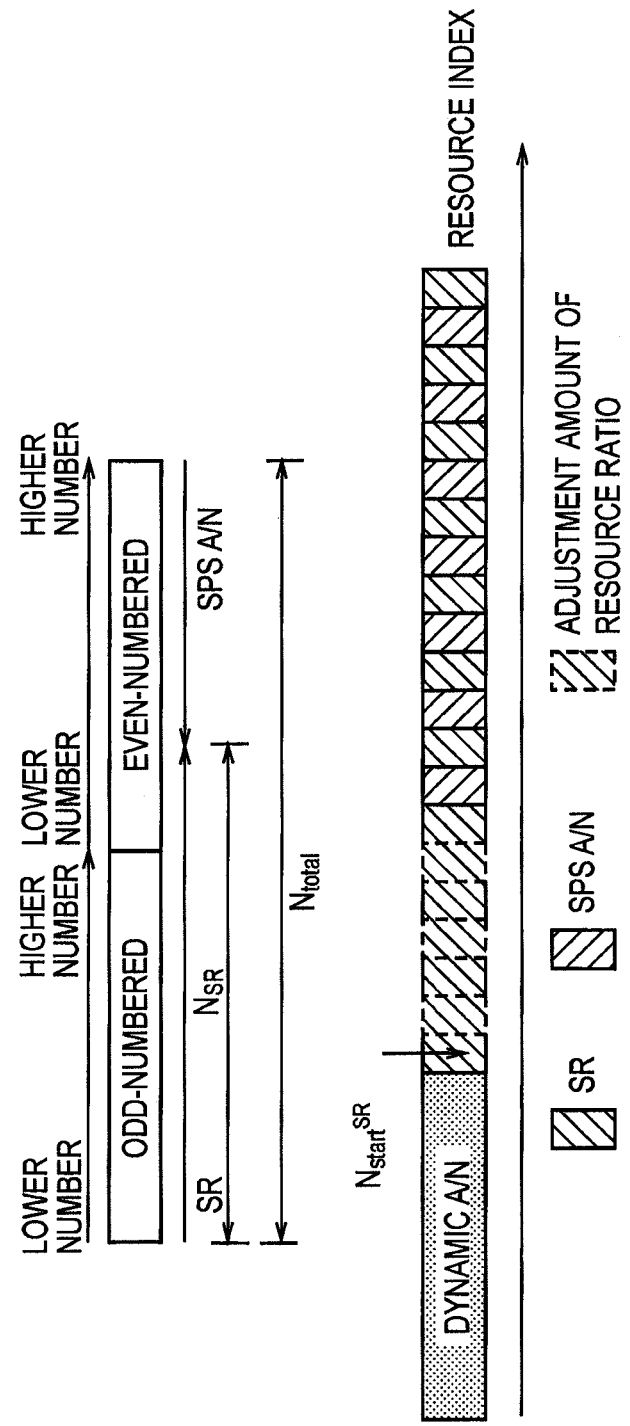
FIG. 11 is a diagram explaining a method in which an SPS A/N transmission resource is assigned by the radio base station according to the first embodiment of the present invention.

As illustrated in FIG. 11, from among the remaining CS/OCs other than CS/OC available as the DS A/N transmission resource, from among CS/OCs available as the A/N transmission resource and the SR transmission resource, when the smallest resource index is an odd number, the resource assignment unit 11 may be configured to set CS/OC to which an odd-numbered resource index is imparted as CS/OC available as the SR transmission resources, in order from CS/OC to which the resource index is imparted.

In such a case, from among the remaining CS/OCs other than CS/OCs available as the DS A/N transmission resources, from among the CS/OCs available as the A/N transmission resource and the SR transmission resource, the resource assignment unit 11 is configured to set CS/OC to which an even-numbered resource index is imparted as CS/OC available as the SPS A/N transmission resources, in order from CS/OC to which the largest resource index is imparted.

Here, as illustrated in FIG. 11, when the number of the CS/OCs used as the SR transmission resource is larger than the number of the CS/OCs used as the SPS A/N transmission resource, the resource assignment unit 11 may be configured to set a predetermined number of CS/OCs as CS/OC available as the SR transmission resource, in order from CS/OC to which the smallest resource index is imparted from among the CS/OCs used as the SPS A/N transmission resource.

Alternately, when the number of the CS/OCs used as the SR transmission resource is smaller than the number of the CS/OCs used as the SPS A/N transmission resource, the resource assignment unit 11 may be configured to set a predetermined number of CS/OCs as CS/OC available as the SPS A/N transmission resource, in order from CS/OC to which the largest resource index is imparted from among the CS/OCs used as the SR transmission resource.

As a result, it is possible to adjust a "resource ratio" indicating the ratio of the number of the CS/OCs available as the SPS A/N transmission resource, relative to the number of the CS/OCs available as the SR transmission resource.

In the example of FIG. 11, the resource index for specifying the CS/OC available as the SR transmission resource is as follows:

$$N_{start}^{SR}+2i(i=0,1,\ldots,\text{ceil}(N_{total}/2)-1)$$

$$N_{start}^{SR}+2j+(j=0,1,\ldots,N_{SR}\square\text{ceil}(N_{total}/2)-1)$$

Further, in the example of FIG. 11, the resource index for specifying the CS/OC available as the SPS A/N transmission resource is as follows:

$$N_{start}^{SR}+2j+1(j=N_{SR}\square\text{ceil}(N_{total}/2),\ldots,\text{floor}(N_{total}/2)-1)$$

Here, the $N_{start}^{SR}$ denotes the smallest resource index of the CS/OC available as the SR transmission resource, the $N_{SR}$ denotes the number of the CS/OCs available as the SR transmission resource, and the $N_{total}$ denotes the number of remaining CS/OCs other than the CS/OC available as the DS A/N transmission resource from among the CS/OCs available as the A/N transmission resource and the SR transmission resource.

It is noted that from among the remaining CS/OCs other than CS/OC available as the DS A/N transmission resource, from among the CS/OCs available as the A/N transmission resource and the SR transmission resource, the resource assignment unit 11 may be configured to set CS/OC to which an even-numbered resource index is imparted as CS/OC available as the SR transmission resource, in order from CS/OC to which the smallest resource index is imparted.

In such a case, from among the remaining CS/OCs other than CS/OC available as the DS A/N transmission resource, from among the CS/OCs available as the A/N transmission resource and the SR transmission resource, the resource assignment unit 11 is configured to set CS/OC to which an odd-numbered resource index is imparted as CS/OC available as the SPS A/N transmission resource, in order from CS/OC to which the largest resource index is imparted.

Further, from among the remaining CS/OCs other than CS/OC available as the DS A/N transmission resource, from among the CS/OCs available as the A/N transmission resource and the SR transmission resource, the resource assignment unit 11 may be configured to set CS/OC to which an even-numbered resource index is imparted as CS/OC available as the SR transmission resource, in order from CS/OC to which the largest resource index is imparted.

In such a case, from among the remaining CS/OCs other than CS/OC available as the DS A/N transmission resource, from among the CS/OCs available as the A/N transmission resource and the SR transmission resource, the resource assignment unit 11 is configured to set CS/OC to which an odd-numbered resource index is imparted as CS/OC available as the SPS A/N transmission resource, in order from CS/OC to which the smallest resource index is imparted.

Moreover, from among the remaining CS/OCs other than CS/OC available as the DS A/N transmission resource, from among the CS/OCs available as the A/N transmission resource and the SR transmission resource, the resource assignment unit 11 may be configured to set CS/OC to which an odd-numbered resource index is imparted as CS/OC available as the SR transmission resource, in order from CS/OC to which the largest resource index is imparted.

In such a case, from among the remaining CS/OCs other than CS/OC available as the DS A/N transmission resource, from among the CS/OCs available as the A/N transmission resource and the SR transmission resource, the resource assignment unit 11 is configured to set CS/OC to which an even-numbered resource index is imparted as CS/OC available as the SPS A/N transmission resource, in order from CS/OC to which the smallest resource index is imparted.

Figure 12:
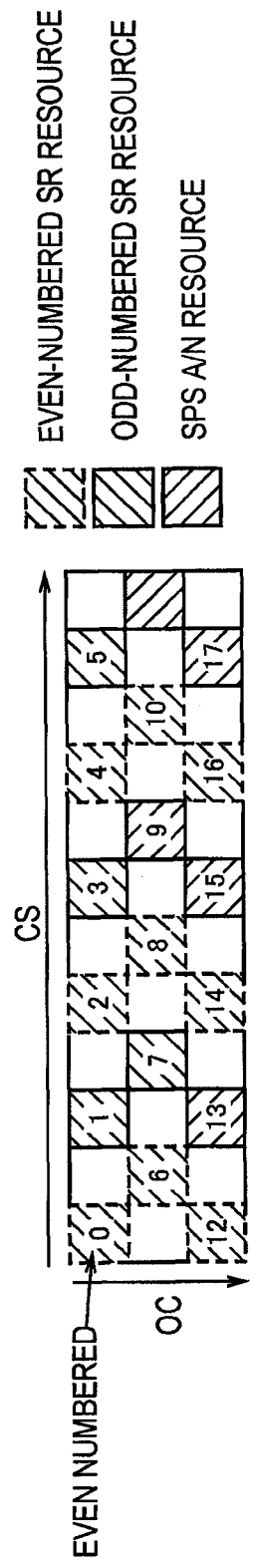
FIG. 12 is a diagram explaining a method in which an SPS A/N transmission resource is assigned by the radio base station according to the first embodiment of the present invention.

FIG. 12 illustrates an example of the assignment order of the CS/OC available as the SR transmission resource and the SPS A/N transmission resource when the $N_{start}^{SR}$ is an even number and the number of the CS/OCs available as the SR transmission resource is larger than the number of the CS/OCs available as the SPS A/N transmission resource.

Here, the resource assignment unit 11 is configured to determine an SPS A/N transmission resource candidate from among predetermined resources formed by a combination of RB (frequency direction resource) and CS/OC (code direction resource) available as the SPS A/N transmission resource.

Specifically, the resource assignment unit 11 is configured to assign the SPS A/N transmission resource candidate to the mobile station UE based on a number of assignments of predetermined resources formed by the combination of the frequency direction resource and the code direction resource.

Figure 13:
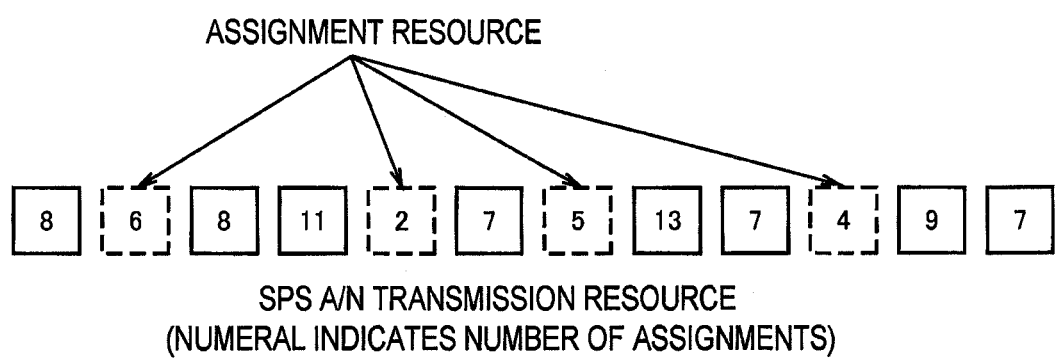
FIG. 13 is a diagram explaining a method in which an SPS A/N transmission resource candidate is assigned by the radio base station according to the first embodiment of the present invention.

For example, as illustrated in FIG. 13, the resource assignment unit 11 may be configured to select a predetermined number of resources with a smaller number of assignments from among the predetermined resources formed by the combination of the RB and the CS/OC, which are available as the SPS A/N transmission resource, during the SPS A/N transmission period of the mobile station UE, and to assign the resources to the mobile station UE as the SPS A/N transmission resource candidate.

Here, the SPS A/N transmission period of the mobile station UE is a period obtained by delaying the "On Duration (discontinuous reception period)" of each mobile station UE by a predetermined timing (e.g., four sub-frames).

Further, the number of assignments of the predetermined resources indicates a total number of other mobile stations UE, to which the predetermined resources are assigned as the SPS A/N transmission resource candidates, at each sub-frame of the SPS A/N transmission period of the mobile station UE.

Figure 14:
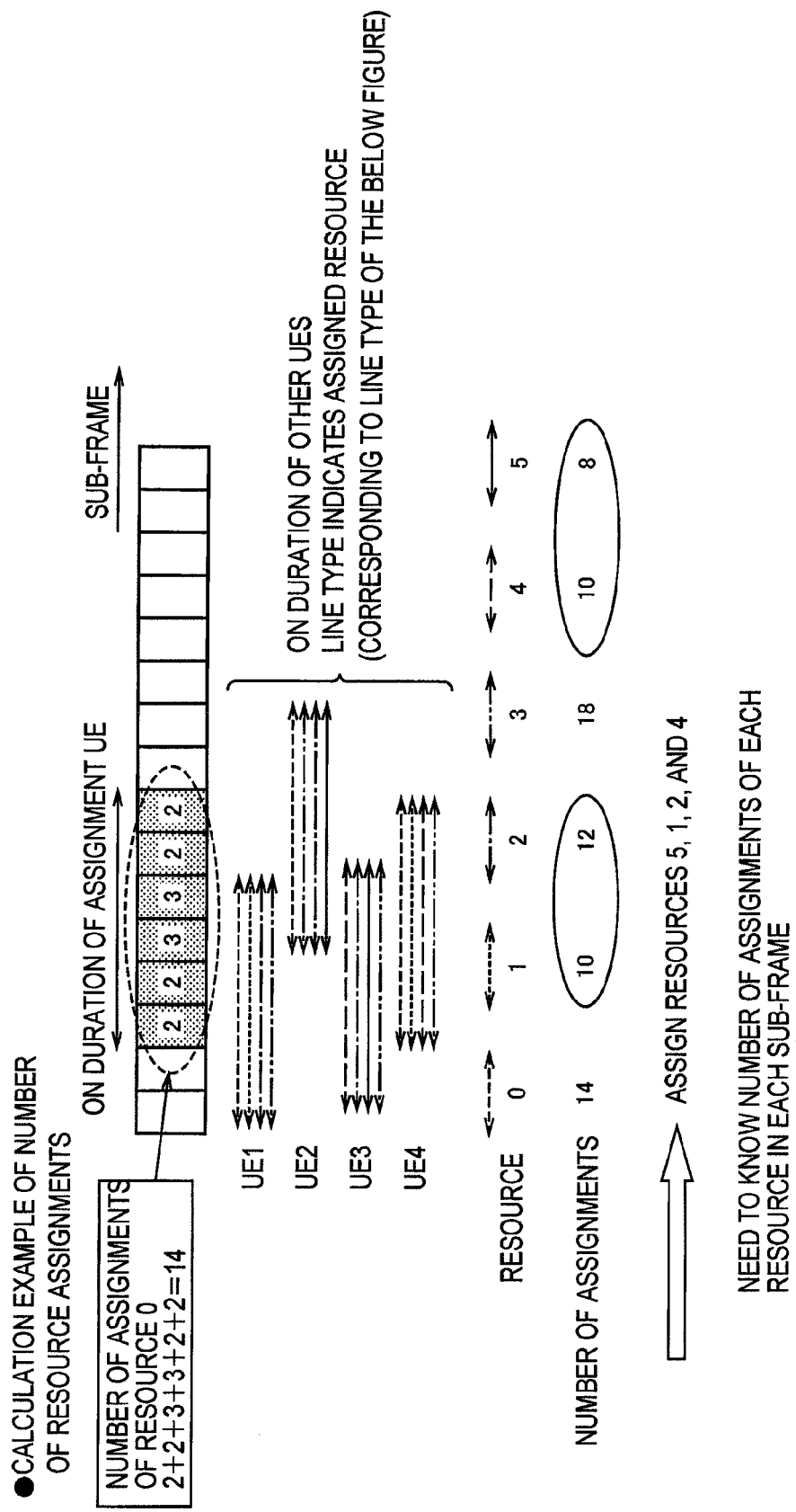
FIG. 14 is a diagram explaining a method in which an SPS A/N transmission resource candidate is assigned by the radio base station according to the first embodiment of the present invention.

More specifically, as illustrated in FIG. 14, the resource assignment unit 11 is configured to assign the SPS A/N transmission resource candidate to the mobile station UE based on a resource assigned, as the SPS A/N transmission resource candidate, to mobile stations UE1 to UE4 (second mobile stations) having "On Duration (discontinuous reception period)" temporally and at least partially overlapping the "On Duration (discontinuous reception period)" of the mobile station UE.

It is noted that in the example of FIG. 14, the mobile stations UE1 to UE4 are configured to operate in a discontinuous reception mode and to receive the downlink data scheduled by the SPS.

In the example of FIG. 14, resources 0, 1, 2, 3 are assigned to the mobile station UE1 as the SPS A/N transmission resource candidates; resources 0, 2, 3, and 5 are assigned to the mobile station UE2 as the SPS A/N transmission resource candidates; resources 2, 3, 4, and 5 are assigned to the mobile station UE3 as the SPS A/N transmission resource candidates; and resources 0, 1, 3, and 4 are assigned to the mobile station UE4 as the SPS A/N transmission resource candidates.

Thus, total values of the number of assignments of each resource in each sub-frame during an SPS A/N transmission period corresponding to the "On Duration (discontinuous reception period)" of the mobile station UE are as follows:

resource 0: 2+2+3+3+2+2=14
resource 1: 2+2+2+2+1+1=10
resource 2: 2+2+3+3+1+1=12
resource 3: 3+3+4+4+2+2=18
resource 4: 2+2+2+2+1+1=10
resource 5: 1+1+2+2+1+1=8

As a result, the resource assignment unit 11 assigns the resources 1, 2, 4, and 5 to the mobile station UE as the SPS A/N transmission resource candidates.

Figure 15:
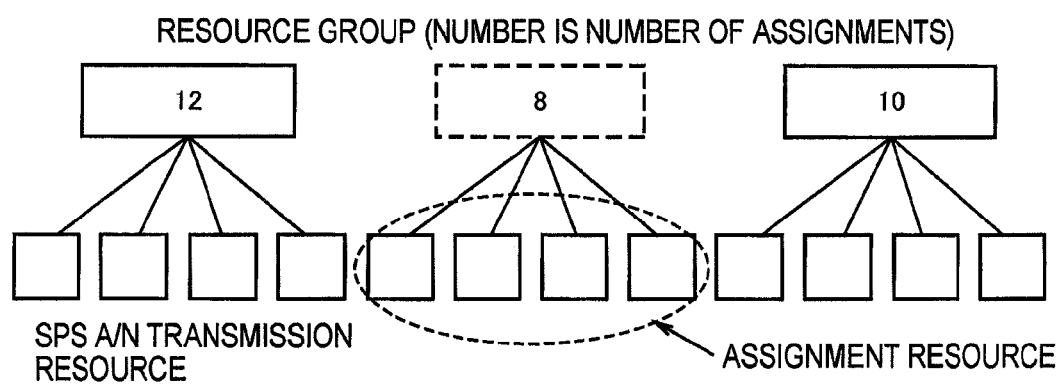
FIG. 15 is a diagram explaining a method in which an SPS A/N transmission resource candidate is assigned by the radio base station according to the first embodiment of the present invention.

Further, as illustrated in FIG. 15, a predetermined number (e.g., four) of resources are set as one resource group, and the resource assignment unit 11 may be configured to assign the SPS A/N transmission resource candidates to the mobile station UE based on a total number of assignments of a predetermined resource group.

For example, the resource assignment unit 11 may be configured to select a predetermined number of resources belonging to a resource group with a smaller number of assignments during the SPS A/N transmission period from among predetermined resources formed by the combination of the RB and the CS/OC, which are available as the SPS A/N transmission resource, and to assign the resources to the mobile station UE as the SPS A/N transmission resource candidates.

Here, the number of assignments of the predetermined resource group indicates the total number of other mobile stations UE, to which resources belonging to the predetermined resource group have been assigned as the SPS A/N transmission resource candidates, at each sub-frame of the SPS A/N transmission period of the mobile station UE.

Figure 16:
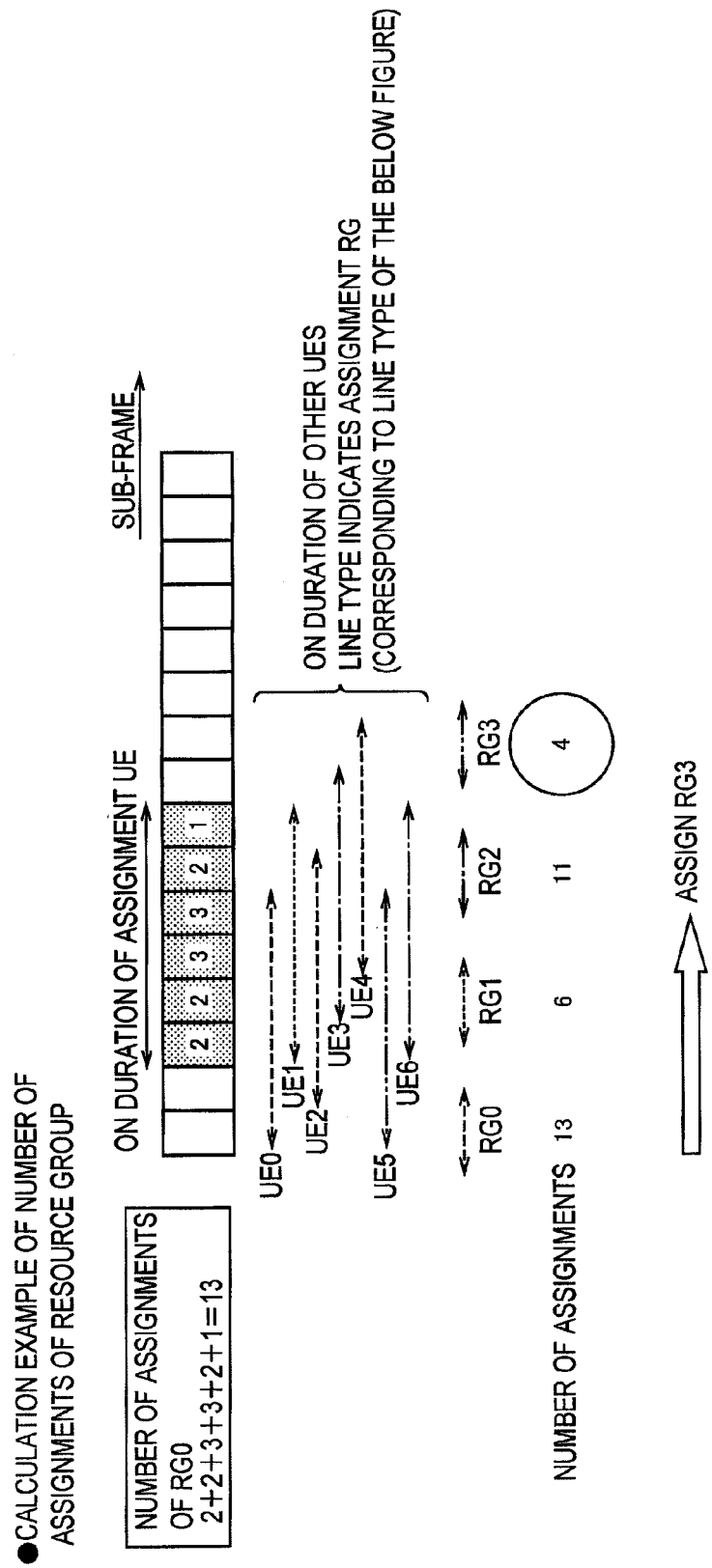
FIG. 16 is a diagram explaining a method in which an SPS A/N transmission resource candidate is assigned by the radio base station according to the first embodiment of the present invention.

More specifically, as illustrated in FIG. 16, the resource assignment unit 11 is configured to assign the SPS A/N transmission resource candidate to the mobile station UE based on a number of assignments during the SPS A/N transmission period of a resource group including resources assigned, as SPS A/N transmission resource candidates, to mobile stations UE0 to UE6 (second mobile stations) having "On Duration (discontinuous reception period)" temporally and at least partially overlapping the "On Duration (discontinuous reception period)" of the mobile station UE.

In the example of FIG. 16, resources belonging to a resource group 0 are assigned to the mobile station UE0 as SPS A/N transmission resource candidates; resources belonging to a resource group 1 are assigned to the mobile station UE1 as the SPS A/N transmission resource candidates; resources belonging to the resource group 0 are assigned to the mobile station UE2 as the SPS A/N transmission resource candidates; resources belonging to a resource group 2 are assigned to the mobile station UE3 as the SPS A/N transmission resource candidates; resources belonging to the resource group 0 are assigned to the mobile station UE4 as the SPS A/N transmission resource candidates; resources belonging to a resource group 3 are assigned to the mobile station UE5 as the SPS A/N transmission resource candidates; and resources belonging to the resource group 2 are assigned to the mobile station UE6 as the SPS A/N transmission resource candidates.

Thus, total values of the number of assignments of each resource group in each sub-frame during an SPS A/N transmission period corresponding to the "On Duration (discontinuous reception period)" of the mobile station UE are as follows:

resource group 0: 2+2+3+3+2+1=13
resource group 1: 1+1+1+1+1+1=6
resource group 2: 1+2+2+2+2+2=11
resource group 3: 1+1+1+1+0+0=4

As a result, the resource assignment unit 11 assigns the resources belonging to the resource group 4 to the mobile station UE as the SPS A/N transmission resource candidates.

As described above, the resource assignment unit 11 is configured to determine the resource index for specifying the resource (the combination of RB and CS/OC) assigned as the SPS A/N transmission resource candidate during the SPS A/N transmission period of each mobile station UE, and the notification unit 12 is configured to notify each mobile station UE of the determined resource index.

Then, when the downlink data is scheduled by the SPS, the resource assignment unit 11 is configured to select a resource for transmitting SPS A/N for the downlink data from among the SPS A/N transmission resource candidates.

That is, in such a case, the resource assignment unit 11 is configured to select a resource index for specifying the resource (SPS A/N transmission resource) for transmitting the SPS A/N for the downlink data from among the SPS A/N transmission resource candidates, and the notification unit 12 is configured to notify each mobile station UE of the selected resource index.

Specifically, the resource assignment unit 11 is configured to select a resource, which is not used by other mobile stations UE, at the same A/N transmission sub-frame from among the SPS A/N transmission resource candidates, and to assign the resource to each mobile station UE as SPS A/N transmission resource.

Each mobile station UE is configured to transmit SPS A/N for the received downlink data using an SPS A/N transmission resource (within the PUCCH resource) specified by the resource index notified after the predetermined timing (e.g., four sub-frames) from the timing of receiving the downlink data.

Here, when an SPS bearer is released, the resource assignment unit 11 may be configured to release the SPS A/N transmission resource candidate and the SPS A/N transmission resource.

(Operation of mobile communication system according to first embodiment of the present invention)

With reference to FIG. 17 to FIG. 20, the operation of the mobile communication system according to this embodiment, specifically, an operation in which the radio base station eNB according to this embodiment assigns the SPS AN transmission resource candidate will be explained.

Firstly, with reference to FIG. 17 and FIG. 18, a first operational example will be explained.

Figure 17:
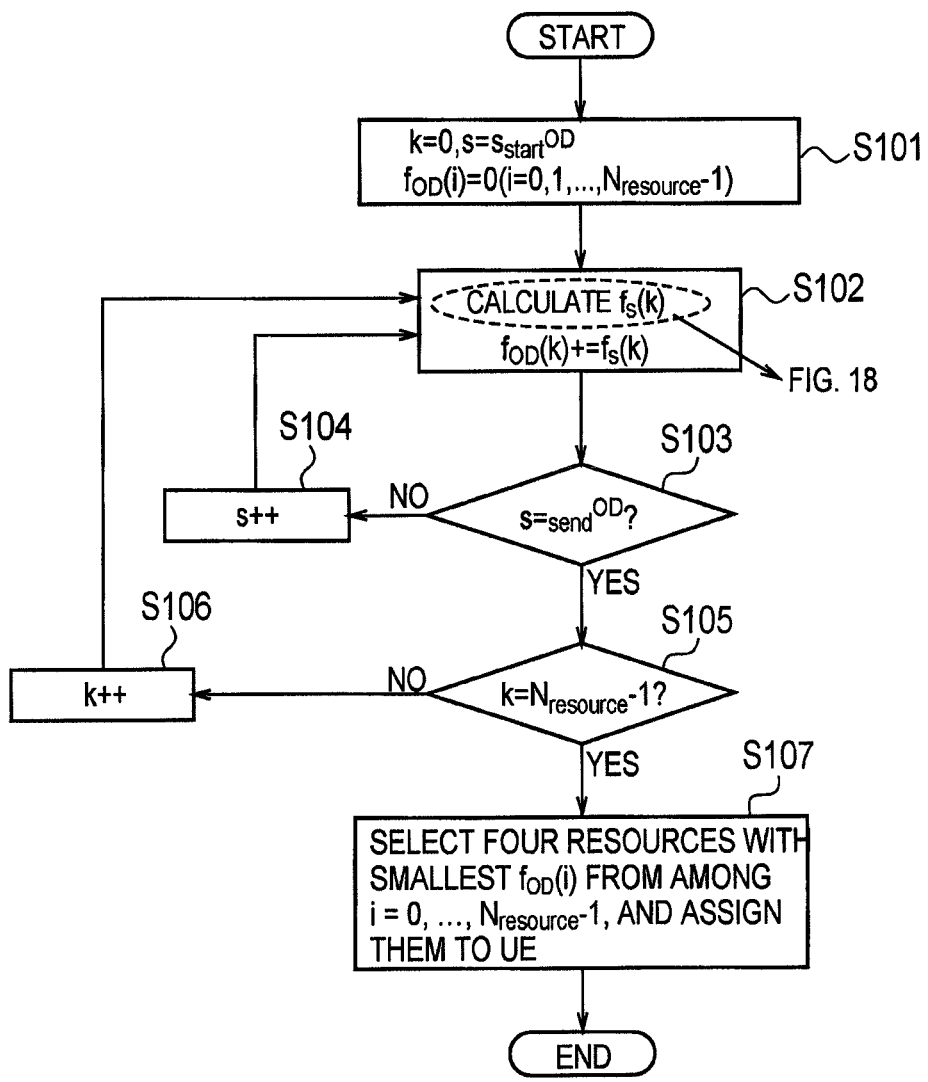
FIG. 17 is a flowchart illustrating an operation of the radio base station according to the first embodiment of the present invention.

As illustrated in FIG. 17, in step S101, the radio base station eNB sets "k=0", "s=$s_{start}^{OD}$", and "$f_{OD}(i)$=0(i=0, 1, . . . ,$N_{resource}$−1)"

Here, the "k" denotes an index for specifying a resource, the "s" denotes an index for specifying a sub-frame, the "$f_{OD}(i)$" denotes a number of assignments of a resource i during an SPS A/N transmission period corresponding to the "On Duration (discontinuous reception period)" of a mobile station UE subject to assignment, and the "$N_{resource}$" denotes the number of resources assignable as the SPS A/N transmission resource.

Further, sub-frames in the SPS A/N transmission period corresponding to the "On Duration (discontinuous reception period)" of the mobile station UE subject to assignment are in the range of "$S_{start}^{OD}$" to "$S_{end}^{OD}$".

In step S102, the radio base station eNB calculates "$f_s(k)$" which denotes a number of assignments of a resource k at a sub-frame s, and adds the "$f_s(k)$" to "$f_{OD}(k)$". Hereinafter, with reference to FIG. 18, a method of calculating the "$f_s(k)$" will be explained.

Figure 18:
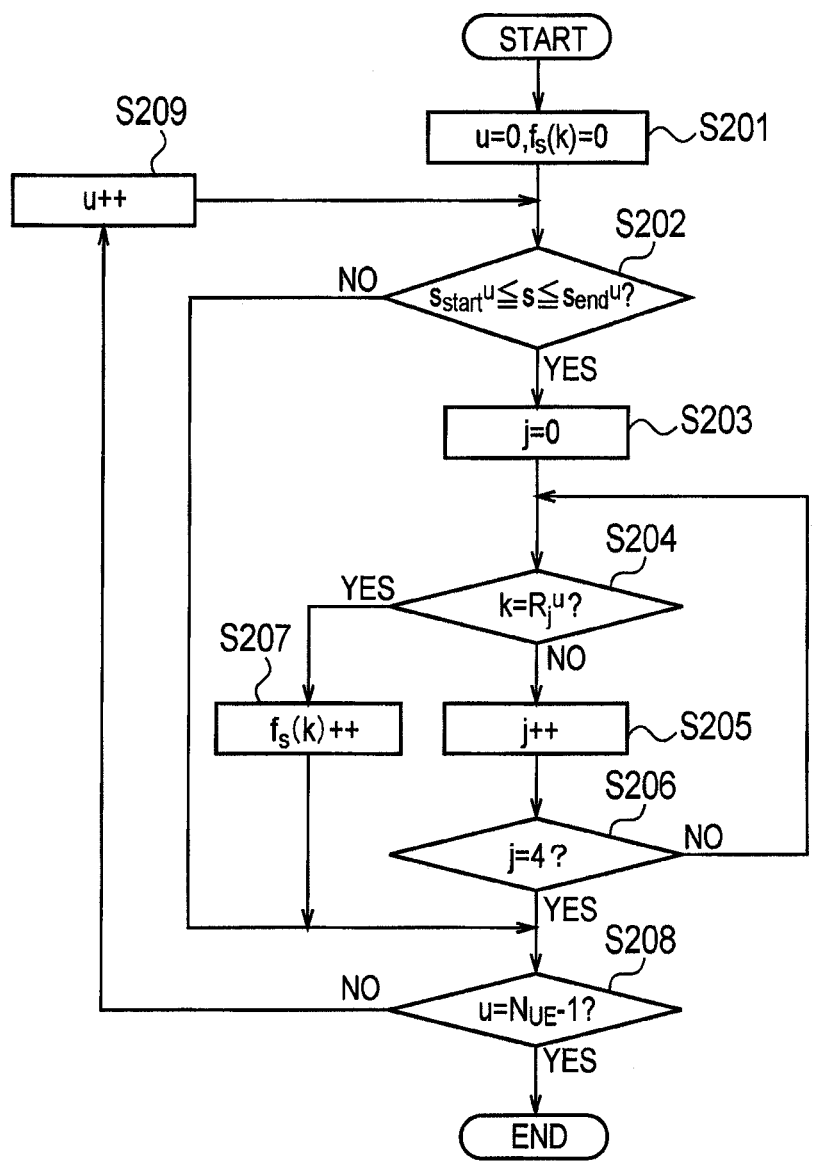
FIG. 18 is a flowchart illustrating an operation of the radio base station according to the first embodiment of the present invention.

As illustrated in FIG. 18, in step S201, the radio base station eNB sets "u=0" and "$f_s(k)=0$". Here, the "u" denotes an index for specifying the mobile station UE.

In step S202, the radio base station eNB determines whether or not "$s_{start}^u \leq s \leq s_{end}^u$" is established. When it is determined that the "$s_{start}^u \leq s \leq s_{end}^u$" is established, the radio base station eNB proceeds to step S203. When it is determined that the "$s_{start}^u \leq s \leq s_{end}^u$" is not established, the radio base station eNB proceeds to step S208.

Here, sub-frames in an SPS A/N transmission period corresponding to the "On Duration (discontinuous reception period)" of a mobile station u are in the range of "$s_{start}^u$" to "$s_{end}^u$".

The radio base station eNB sets "j=0" in step S203 and determines whether or not "$k=R_j^u$" is established in step S204. When it is determined that the "$k=R_j^u$" is established, the radio base station eNB proceeds to step S207. When it is determined that the "$k=R_j^u$" is not established, the radio base station eNB proceeds to step S205.

Here, the "$R_j^u$" denotes information for identifying a resource assigned to the mobile station u as an SPS A/N transmission resource candidate.

The radio base station eNB increases "j" by "1" in step S205 and determines whether or not "j=4" is established in step S206. When it is determined that the "j=4" is established, the radio base station eNB proceeds to step S208. When it is determined that the "j=4" is not established, the radio base station eNB returns to step S204.

Meanwhile, the radio base station eNB increases "$f_s(k)$" by "1" in step S207 and proceeds to step S208.

In step S208, the radio base station eNB determines whether or not "$u=N_{ue}-1$" is established. When it is determined that the "$u=N_{ue}-1$" is established, the radio base station eNB completes the present operation and returns to the operation of FIG. 17. When it is determined that the "$u=N_{ue}-1$" is not established, the radio base station eNB returns to step S209 and increases "u" by "1".

Here, "$N_{ue}$" denotes the number of mobile stations UE to which SPS A/N transmission resource candidates have been already assigned.

In step S103, the radio base station eNB determines whether or not "$s=s_{end}^{OD}$" is established. When it is determined that the "$s=s_{end}^{OD}$" is established, the radio base station eNB proceeds to step S105. When it is determined that the "$s=s_{end}^{OD}$" is not established, the radio base station eNB proceeds to step S104.

The radio base station eNB increases "s" by "1" in step S104 and returns to step S102.

In step S105, the radio base station eNB determines whether or not "$k-N_{resource}-1$" is established. When it is determined that the "$k=N_{resource}-1$" is established, the radio base station eNB proceeds to step S107. When it is determined that the "$k=N_{resource}-1$" is not established, the radio base station eNB proceeds to step S106.

The radio base station eNB increases "k" by "1" in step S106 and returns to step S102.

In step S107, the radio base station eNB selects "i" corresponding to small four "$f_{OD}(i)$" from among i(=0, 1, . . . , $N_{resource}-1$), and assigns resources specified by "$f_s(k)$" corresponding to the selected "i" as SPS A/N transmission resource candidates for the mobile station UE subject to assignment.

Secondly, with reference to FIG. 19 and FIG. 20, a second operation example will be explained.

Figure 19:
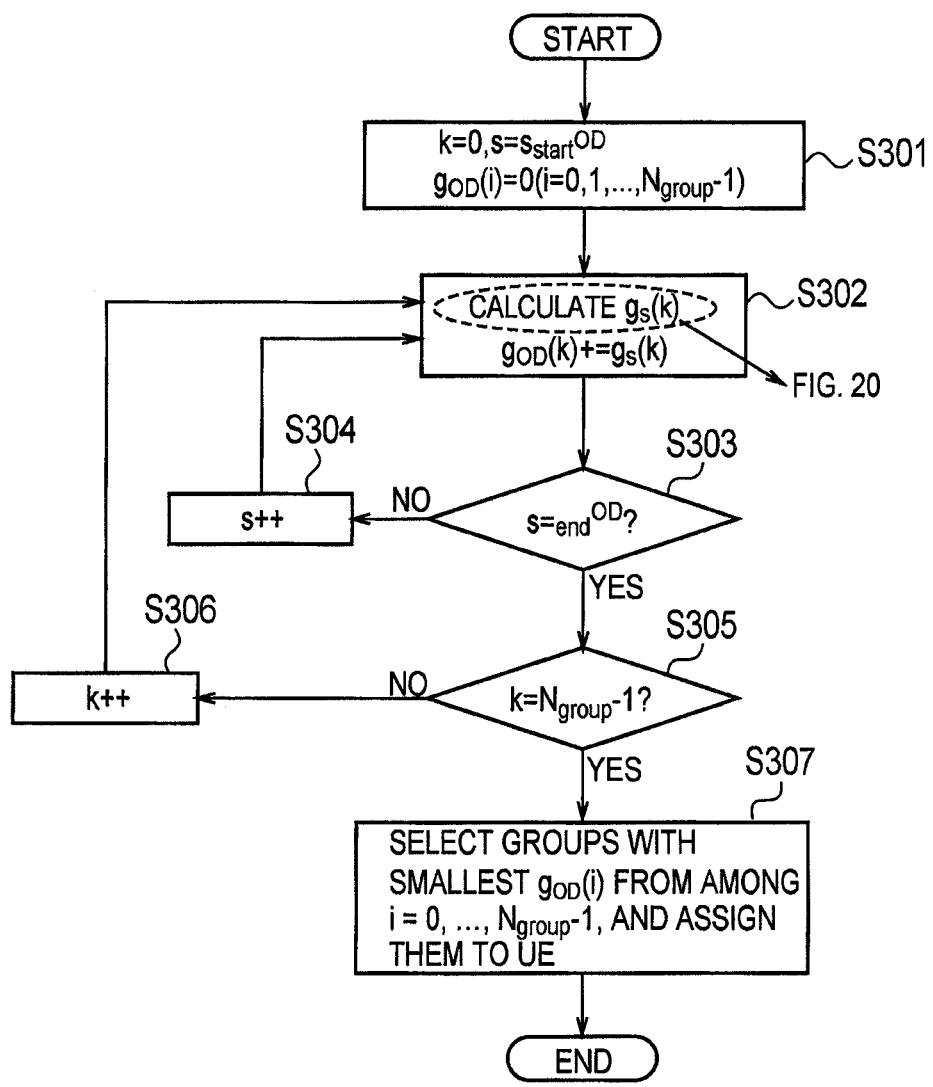
FIG. 19 is a flowchart illustrating an operation of the radio base station according to the first embodiment of the present invention.

As illustrated in FIG. 19, in step S301, the radio base station eNB sets "k=0", "$s=s_{start}^{OD}$", and "$g_{OD}(i)=0(i=0, 1, \ldots, N_{group}-1)$"

Here, the "$g_{OD}(i)$" denotes a number of assignments of a resource group i during an SPS A/N transmission period corresponding to the "On Duration (discontinuous reception period)" of a mobile station UE subject to assignment, and the "$N_{group}$" denotes the number of resource groups including the resource assignable as the SPS A/N transmission resource.

In step S202, the radio base station eNB calculates "$g_s(k)$" which denotes a number of assignments of a resource group k at a sub-frame s, and adds the "$g_s(k)$" to "$g_{OD}(k)$". Hereinafter, with reference to FIG. 20, a method of calculating the "$g_s(k)$" will be explained.

Figure 20:
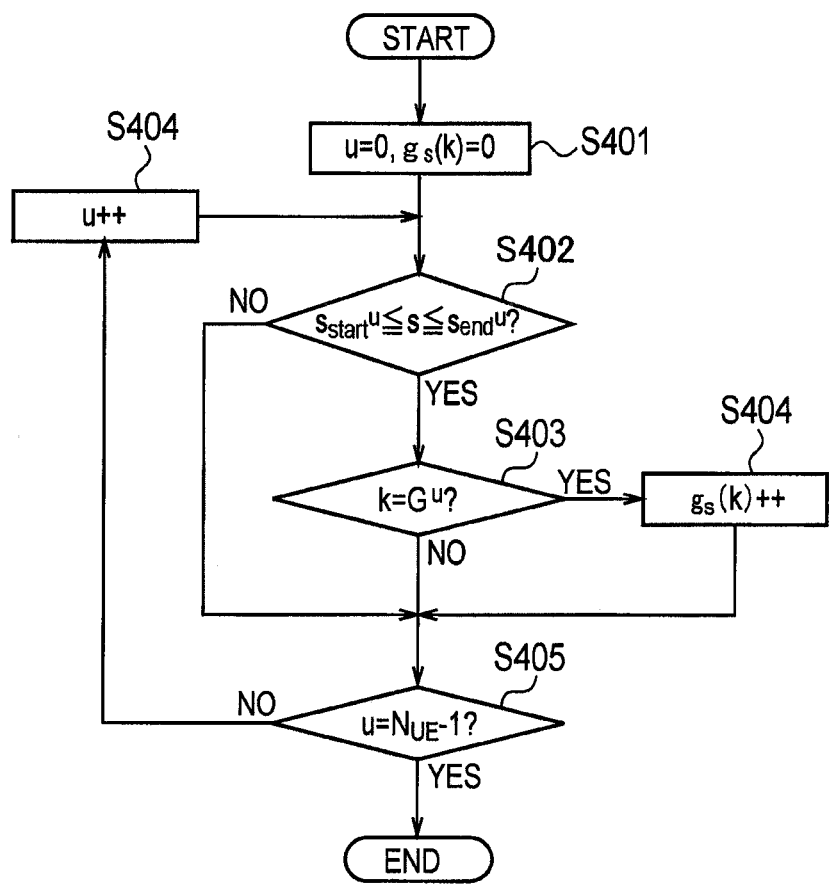
FIG. 20 is a flowchart illustrating an operation of the radio base station according to the first embodiment of the present invention.

As illustrated in FIG. 20, in step S401, the radio base station eNB sets "u=0" and "$g_s(k)=0$".

In step S402, the radio base station eNB determines whether "$s_{start}^u \leq s \leq s_{end}^u$" is established. When it is determined that the "$s_{start}^u \leq s \leq s_{end}^u$" is established, the radio base station eNB proceeds to step S403. When it is determined that the "$s_{start}^u \leq s \leq s_{end}^u$" is not established, the radio base station eNB proceeds to step S405.

In step S403, the radio base station eNB determines whether or not "$k=G^u$" is established. When it is determined that the "$k=G^u$" is established, the radio base station eNB proceeds to step S404. When it is determined that the "$k=G^u$" is not established, the radio base station eNB proceeds to step S405.

Here, the "$G^u$" denotes information for identifying resource groups assigned to a mobile station u as the SPS A/N transmission resource candidate.

The radio base station eNB increases the "$g_s(k)$" by "1" in step S404 and proceeds to step S405.

In step S405, the radio base station eNB determines whether or not "$u=N_{ue}-1$" is established. When it is determined that the "$u=N_{ue}-1$" is established, the radio base station eNB completes the present operation and returns to the operation of FIG. 19. When it is determined that the "$u=N_{ue}-1$" is not established, the radio base station eNB increases "u" by "1" in step S404.

In step S303, the radio base station eNB determines whether or not "$s=s_{end}^{OD}$" is established. When it is determined that the "$s=s_{end}^{OD}$" is established, the radio base station eNB proceeds to step S305. When it is determined that the "$s=s_{end}^{OD}$" is not established, the radio base station eNB proceeds to step S304.

The radio base station eNB increases "s" by "1" in step S304 and returns to step S302.

In step S305, the radio base station eNB determines or not whether "$k=N_{group}-1$" is established. When it is determined that the "$k=N_{group}-1$" is established, the radio base station eNB proceeds to step S307. When it is determined that the "$k=N_{group}-1$" is not established, the radio base station eNB proceeds to step S306.

The radio base station eNB increases "k" by "1" in step S306 and returns to step S302.

In step S307, the radio base station eNB selects "i" corresponding to small four "$g_{OD}(i)$" from "$i(=0,1,\ldots,N_{group}-1)$", and assigns resources belonging to the "$g_s(k)$" corresponding to the selected "i" as SPS A/N transmission resource candidates for the mobile station UE subject to assignment.

(Operation and Effect of the mobile communication system according to the first embodiment of the present invention)

In accordance with the mobile communication system according to the first embodiment of the present invention, since the radio base station eNB is configured to assign an SPS A/N transmission resource candidate to each mobile station UE during an SPS bearer setting process, and to assign an SPS A/N transmission resource from among the SPS A/N transmission resource candidates when downlink data is scheduled by SPS in an SPS transmission bearer, it is possible to avoid a collision of SPS A/Ns transmitted among a plurality of mobile stations UE.

The above-mentioned characteristics of the embodiment may be expressed as follows:

A first characteristic of this embodiment is a radio base station eNB that includes a resource assignment unit 11 configured to assign an SPS A/N transmission resource candidate to a mobile station UE (first mobile station) during an SPS bearer setting process, in which the SPS A/N transmission resource candidate is a resource candidate formed by a combination of a frequency direction resource and a code direction resource to which the mobile station UE transmits the SPS A/N to downlink data that has been scheduled by the SPS and has been transmitted via PDSCH, after a predetermined timing (e.g., four sub-frames) from a timing of receiving the downlink data; and the resource assignment unit 11 is configured to assign the SPS A/N transmission resource candidate to the mobile station UE based on a number of assignments of predetermined resources formed by a combination of the frequency direction resource and the code direction resource during the SPS A/N transmission period of the mobile station UE, and when the downlink data has been scheduled by the SPS, the resource assignment unit 11 is configured to select a resource for transmitting the SPS A/N for the downlink data from among the SPS A/N transmission resource candidates.

In the first characteristic of this embodiment, the SPS A/N transmission period of the mobile station UE may be a period obtained by delaying the "On Duration (discontinuous reception period)" of the mobile station UE by a predetermined timing (e.g., four sub-frames).

In the first characteristic of this embodiment, the number of assignments of the predetermined resources may be a total number of other mobile stations UE, to which the predetermined resources are assigned as the SPS A/N transmission resource candidates, at each sub-frame during the SPS A/N transmission period of the mobile station UE.

In the first characteristic of this embodiment, the resource assignment unit 11 may be configured to assign the SPS A/N transmission resource candidate to the mobile station UE based on resources assigned, as the SPS A/N transmission resource candidate, to mobile stations UE1 to UE4 (second mobile stations) having a discontinuous reception period temporally and at least partially overlapping the discontinuous reception period of the mobile station UE.

In the first characteristic of this embodiment, the configuration may be such that the number of assignments of the predetermined resources is a number of assignments of resources belonging to a predetermined resource group during the SPS A/N transmission period of the mobile station UE, and the resource assignment unit 11 assigns the SPS A/N transmission resource candidate in a resource group unit.

In the first characteristic of this embodiment, the predetermined resource group may be a resource group including resources assigned, as the SPS A/N transmission resource candidates, to mobile stations UE0 to UE6 having a discontinuous reception period temporally and at least partially overlapping the discontinuous reception period of the mobile station UE.

A second characteristic of this embodiment is a mobile communication method that includes a step A of assigning an SPS A/N transmission resource candidate to a mobile station UE during an SPS bearer setting process, in which the SPS A/N transmission resource candidate is a resource candidate formed by a combination of a frequency direction resource and a code direction resource by which the mobile station UE transmits the SPS A/N to downlink data that has been scheduled by the SPS and has been transmitted via PDSCH, after a predetermined timing from a timing of receiving the downlink data; in the step A, the SPS A/N transmission resource candidate is assigned to the mobile station UE based on a number of assignments of predetermined resources formed by a combination of a frequency direction resource and a code direction resource during the SPS A/N transmission period of the mobile station UE, and the mobile communication method further includes a step B of, when the downlink data is scheduled by the SPS, selecting a resource for transmitting SPS A/N for the downlink data from among the SPS A/N transmission resource candidates.

Note that operation of the above described the radio base station eNB and the mobile station UE may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the radio base station eNB or the mobile station UE. Also, the storage medium and the processor may be provided in the radio base station eNB or the mobile station UE as a discrete component.

See the following for the details in FIG. 17:
the number of resources to be assigned as the SPS A/N transmission resource: $N_{resource}$
(resource number: $0,\ldots,N_{resource}-1$)
* This number differs from the resource index.
subframe within the SPS A/N transmission period corresponding to On duration set to UE to be assigned: $s_{start}^{OD}, s_{start}^{OD}+1,\ldots,s_{end}^{OD}$
Assignment number of resources k in subframe s: $f_s(k)$
Assignment number of resources i in the SPS A/N transmission period corresponding to On duration of UE to be assigned: $f_{OD}(i)$ Further, see the following for the details in FIG. 18:
UE number to which the SPS A/N transmission resource candidate is already assigned: $N_{UE}$(UE number: $0, 1,\ldots,N_{UE}-1$)
subframe within the SPS A/N transmission period corresponding to On Duration set to UE#u: $s_{start}^U, s_{start}^U+1,\ldots,s_{end}^U$ resources assigned to UE#u as the SPS A/N transmission resource candidate: $R_j^U$ (j=0, ..., 3)

See the following for the details in FIG. 19:

the number of resource groups o be assigned as the SPS A/N transmission resource group: $N_{group}$ (group number: 0, ..., $N_{group}-1$)

subframe within the SPS A/N transmission period corresponding to On duration set to UE to be assigned: $s_{start}^{OD}, s_{start}^{OD}+1, \ldots, s_{end}^{OD}$ Assignment number of resource groups k in subframe s: $g_s(k)$ Assignment number of resource groups i in the SPS A/N transmission period corresponding to On duration of UE to be assigned: $g_{OD}(i)$ See the following for the details in FIG. 20:

UE number to which the SPS A/N transmission resource candidate is already assigned: $N_{UE}$ (UE number: 0, 1, ..., $N_{UE}-1$)

subframe within the SPS A/N transmission period corresponding to On Duration set to UE#u: $s_{start}^U, s_{start}^U+1, s_{end}^U$.

Resource groups assigned to UE#u as the SPS A/N transmission resource candidate: $G^U$ Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A radio base station comprising:
a resource assignment unit configured to assign resource candidates to a first mobile station for transmitting a semi-persistent scheduling transmission acknowledgement signal, in a semi-persistent scheduling bearer setting process, wherein
said resource candidates respectively formed by a combination of a frequency direction resource and a code direction resource that the first mobile station uses for transmitting a transmission acknowledgement signal after a predetermined timing from a timing of receiving downlink data via a downlink data channel scheduled by semi-persistent scheduling, and
the resource assignment unit is configured to assign the resource candidates to the first mobile station, based on an assigned number of predetermined resources during a transmission period for transmitting the semi-persistent scheduling transmission acknowledgement signal transmitted from the first mobile station, the predetermined resource being formed by a combination of a frequency direction resource and a code direction resource, and
the resource assignment unit is configured to select a resource for transmitting the semi-persistent scheduling transmission acknowledgement signal from among the resource candidates, when the downlink data is scheduled by the semi-persistent scheduling,
wherein
the assigned number of the predetermined resources is a total number of other mobile stations, to which the predetermined resource has been assigned as resource candidates for transmitting a semi-persistent scheduling transmission acknowledgement signal from the other mobile stations, at each sub-frame of the transmission period for transmitting the semi-persistent scheduling transmission acknowledgement signal from the first mobile station.

2. The radio base station according to claim 1, wherein the transmission period for transmitting the semi-persistent scheduling transmission acknowledgement signal is a period delayed by the predetermined timing from a discontinuous reception period of the first mobile station.

3. The radio base station according to claim 1, wherein
the resource assignment unit is configured to assign the resource candidates to the first mobile station, based on a resource assigned to a second mobile station as resource candidates for transmitting a semi-persistent scheduling transmission acknowledgement signal from the second mobile station, the second mobile station having a discontinuous reception period temporally and at least partially overlapping a discontinuous reception period of the first mobile station.

4. The radio base station according to claim 1, wherein
the assigned number of the predetermined resources is a number resources assigned to a predetermined resource group during the transmission period for transmitting the semi-persistent scheduling transmission acknowledgement signal from the first mobile station, and
the resource assignment unit is configured to respectively assign the resource candidates for each resource group.

5. The radio base station according to claim 1, wherein
the predetermined resource group is a resource group including resources assigned to a second mobile station as resource candidates for transmitting a semi-persistent scheduling transmission acknowledgement signal from the second mobile station, the second mobile station having a discontinuous reception period temporally and at least partially overlapping the discontinuous reception period of the first mobile station.

6. A mobile communication method, comprising:
a step A of assigning resource candidates to a first mobile station for transmitting a semi-persistent scheduling transmission acknowledgement signal, in a semi-persistent scheduling bearer setting process, wherein
said resource candidates respectively formed by a combination of a frequency direction resource and a code direction resource that the first mobile station uses for transmitting a transmission acknowledgement signal after a predetermined timing from a timing of receiving downlink data via a downlink channel scheduled by semi-persistent scheduling,
in the step A, the resource candidates are assigned to the first mobile station, based on an assigned number of predetermined resources during a transmission period for transmitting the semi-persistent scheduling transmission acknowledgement signal transmitted from the first mobile station, the predetermined resource being formed by a combination of a frequency direction resource and a code direction resource,
the mobile communication method further includes a step B of selecting a resource for transmitting the semi-persistent scheduling transmission acknowledgement signal from among the resource candidates, when the downlink data is scheduled by the semi-persistent scheduling, and
in the step A, the assigned number of the predetermined resources is a total number of other mobile stations, to which the predetermined resource has been assigned as resource candidates for transmitting a semi-persistent scheduling transmission acknowledgement signal from the other mobile stations, at each sub-frame of the transmission period for transmitting the semi-persistent scheduling transmission acknowledgement signal from the first mobile station.

7. The radio base station according to claim 2, wherein the assigned number of the predetermined resources is a total number of other mobile stations, to which the predetermined resource has been assigned as the resource candidates for transmitting a semi-persistent scheduling transmission acknowledgement signal, at each sub-frame of the semi-persistent scheduling transmission acknowledgement signal transmission period of the first mobile station.

8. The radio base station according to claim 2, wherein the resource assignment unit is configured to assign the resource candidates for transmitting a semi-persistent scheduling transmission acknowledgement signals to the first mobile station based on a resource assigned, as the resource candidates for transmitting a semi-persistent scheduling transmission acknowledgement signal, to a second mobile station having a discontinuous reception period temporally and at least partially overlapping the discontinuous reception period of the first mobile station.

9. The radio base station according to claim 1, wherein the resource assignment unit is configured to assign the resource candidates for transmitting a semi-persistent scheduling transmission acknowledgement signals to the first mobile station based on a resource assigned, as the resource candidates for transmitting a semi-persistent scheduling transmission acknowledgement signal, to a second mobile station having a discontinuous reception period temporally and at least partially overlapping the discontinuous reception period of the first mobile station.

* * * * *